No. 896,128. PATENTED AUG. 18, 1908.
W. J. MAGEE.
ATTACHMENT FOR HORSESHOES.
APPLICATION FILED MAR. 13, 1908.
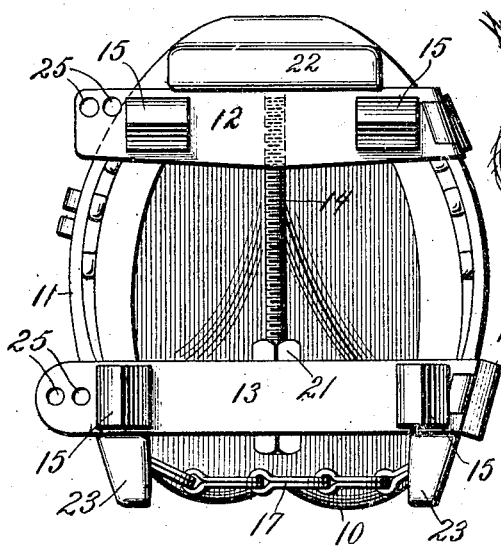
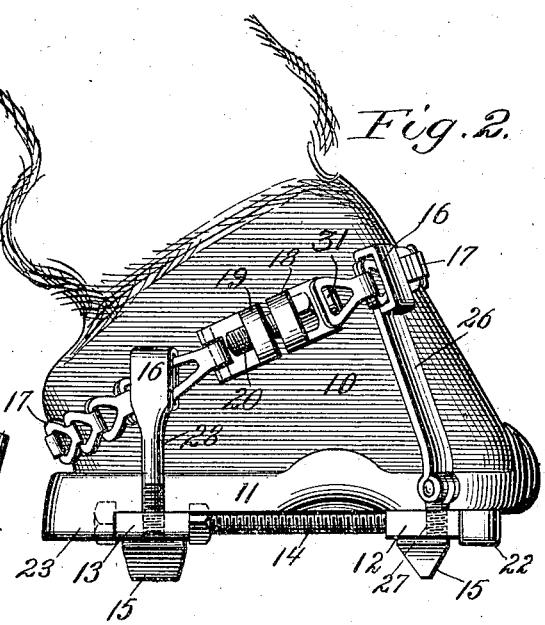
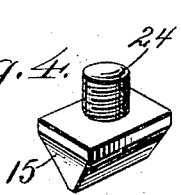
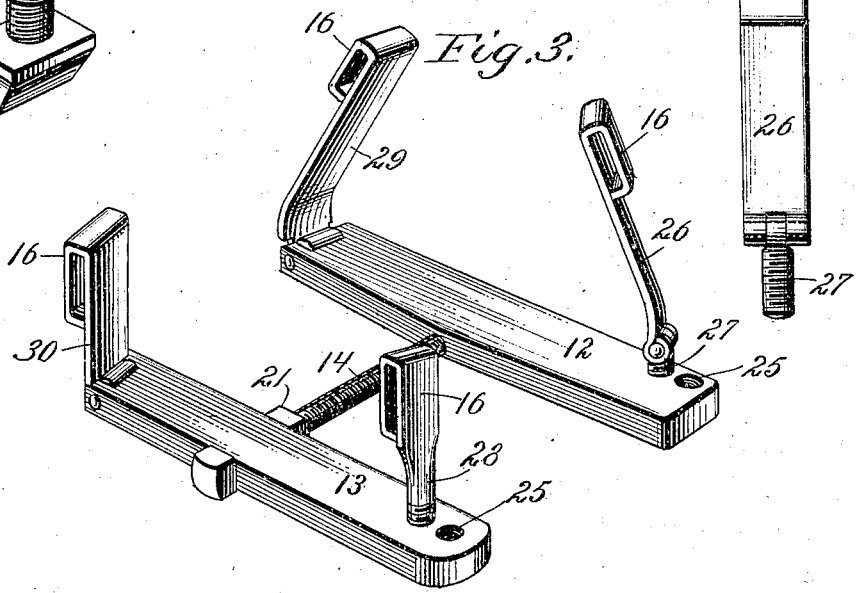
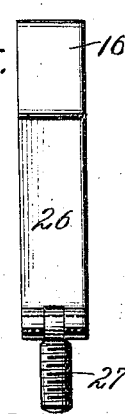
Witnesses:
Inventor
William J. Magee,
By his Attorney

UNITED STATES PATENT OFFICE.

WILLIAM J. MAGEE, OF NEW YORK, N. Y.

ATTACHMENT FOR HORSESHOES.

No. 896,128.  Specification of Letters Patent.  Patented Aug. 18, 1908.

Application filed March 13, 1908. Serial No. 420,858.

*To all whom it may concern:*

Be it known that I, WILLIAM J. MAGEE, a citizen of the United States, and a resident of New York city, in the county of New York and State of New York, have invented certain new and useful Improvements in Attachments for Horseshoes, of which the following is a specification.

The invention relates to improvements in attachments for horseshoes, and it consists in the novel features hereinafter described, and particularly pointed out in the claims.

The object of the invention is to provide a thoroughly efficient attachment capable of being conveniently applied to a horseshoe nailed on the hoof of a horse for use in preventing the horse from slipping on ice covered streets.

The attachment of my invention, in its preferred construction, is adjustable to the shoe and hoof of the horse, so that it may be applied to shoes and hoofs varying in size and shape.

The invention will be fully understood from the detailed description hereinafter presented, reference being had to the accompanying drawings, in which:

Figure 1 is a bottom view of the hoof and shoe of a horse with the attachment of my invention applied thereto; Fig. 2 is a side elevation of the same; Fig. 3 is a detached perspective view of the attachment, less the calks which are applied thereto when the same is in use; Fig. 4 is a detached perspective view of one of the calks, and Fig. 5 is a detached side elevation of one of the front straps forming a part of the attachment.

In the drawings 10 designates the hoof of a horse and 11 a shoe of ordinary type secured thereto. Upon the shoe 11 and hoof 10 I apply the attachment of my invention, which attachment comprises front and rear transversely extending bars 12, 13, an adjusting screw or threaded rod 14 connecting said bars, calks 15 applied to the end portions of said bars, metal straps extending upwardly from the end portions of said bars to lie against the hoof and having eyes 16 at their upper ends, and a chain 17 which is strung through said eyes and fastened around the hoof for aiding in detachably securing the attachment to the shoe, said chain having on its ends angle-plates 18, 19, respectively, connected by an adjusting screw 20, by which said plates may be drawn toward each other for tightening the chain around the hoof or permitted to recede from each other for loosening said chain.

The bars 12, 13 are connected by the screw 14 which extends transversely through the bar 13 and enters a threaded hole in the bar 12 and is provided with a lock-nut 21 to engage the inner edge of said bar 13 when said bars have been adjusted into proper relation to each other and to the shoe. The shoe 11 shown is formed with a toe-plate 22 and heel-calks 23 of usual character and the frame composed of the connected bars 12, 13 is set in between said plate and calks and firmly bound against the same by means of the screw 14, the latter thus not only preserving the relation of said bars to each other but binding the same against the toe-plate 22 and heel-calks 23 and aiding in the firm attachment of the frame to the shoe. The bars 12, 13 are provided at their opposite end portions with the calks 15, which are in the form of blocks of metal having downwardly converging sides and upper threaded stems 24 to be screwed into said bars, said calks thus being of durable character and renewable.

At the outer sides of the hoofs, the bars 12, 13 will preferably be formed with a series of threaded apertures 25 as means for enabling the attachment to be applied to shoes varying in dimensions, as hereinafter explained. At the outer end of the bar 12 I provide a metal strap 26 having at its lower end a hinged screw 27 to enter any one of the apertures 25 in said bar, and at the outer end of the bar 13 I provide a strap 28 having a threaded lower end adapted to any one of the apertures 25 of said bar 13.

The inner ends of the bars 12, 13 are furnished with hinged straps 29, 30 respectively. The straps 26, 28, 29, 30 are adapted to the hoof 10 and provided at their upper ends with the eyes 16, the hinging of the straps 26, 29 being very desirable for enabling them to lie close against the variously inclined front surfaces of hoofs. The screw 27 of the front strap 26 and the threaded end of the rear strap 28 will be entered into the apertures 25 of the bars 12, 13 nearest to the outer edge of the shoe to which the attachment may be applied, the inner apertures 25 being intended to receive said screw and threaded end when the attachment is to be applied to a shoe of medium size and the outer apertures 25 being provided to receive the same when the attachment is to be applied to a wider shoe.

The provision of the series of apertures 25 in the outer ends of the bars 12, 13 and the screws on the straps 26, 28, enables the attachment to be applied to shoes varying in size, and this is of importance since thereby it is rendered unnecessary to make a special attachment for each size of shoe and the attachments may be carried in stock for ready application to the shoes of horses when the emergency requiring their use arises. The chain 17 is strung through the eyes 16 of the straps 26, 28, 29 and 30, and one end of said chain is hinged to the angle-plate 19, while the other end of said chain is detachably caught on a hook or projection 31 carried by the angle-plate 18.

In securing the attachment to the shoe, the bars 12, 13 will first be adjusted to the shoe by means of the screw 14, as hereinbefore explained, and then the free end of the chain 17 will be caught on the hook or projection 31 and the chain tightened around the hoof by turning the screw 20 to draw the angle-plates 18, 19 toward each other. A reverse motion of the screw 20 will effect the loosening of the chain 17 to permit the removal of the attachment. The chain 17 constitutes a flexible band and I do not confine myself to making this band out of a linked chain, although I prefer the use of the chain.

What I claim as my invention and desire to secure by Letters Patent, is:

1. An attachment for horseshoes comprising front and rear bars transversely extending across the lower surface of the shoe and having calks on their end portions, a screw connecting said bars and enabling an adjustment of the same toward and from each other, straps connected with the ends of said bars and extending upwardly to lie against the hoof, and a flexible band connecting the upper ends of said straps and having means for tightening it around the hoof; substantially as set forth.

2. An attachment for horseshoes comprising front and rear bars transversely extending across the lower surface of the shoe and having calks on their end portions, a screw connecting said bars and enabling an adjustment of the same toward and from each other, straps connected with the ends of said bars and extending upwardly to lie against the hoof, and a flexible band connecting the upper ends of said straps and having means for tightening it around the hoof, the said straps connected with the ends of the front bar being hinged to fold against the inclined front surfaces of the hoof; substantially as set forth.

3. An attachment for horseshoes comprising front and rear bars extending transversely across the lower surface of the shoe and having calks on their end portions, a rod connecting said bars, straps connected with both ends of each of said bars and extending upwardly to lie against the hoof and having eyes at their upper ends, and a flexible band extending through the eyes of said straps and having means for tightening it around the hoof, said calks being separate blocks of metal having downwardly converging sides and provided with threaded stems on their upper ends to be screwed into said bars; substantially as set forth.

4. An attachment for horseshoes comprising front and rear bars extending transversely across the lower surface of the shoe and having calks on their end portions, a rod connecting said bars, straps connected with both ends of each of said bars and extending upwardly to lie against the hoof and having eyes at their upper ends, and a flexible band extending through the eyes of said straps and having means for tightening it around the hoof, the said straps connected with the ends of the front bar being hinged to fold against the inclined front surfaces of the hoof and the outer side straps having threaded lower portions to enter apertures in the outer ends of said bars; substantially as set forth.

5. An attachment for horseshoes comprising front and rear bars extending transversely across the lower surface of the shoe and having calks on their end portions, a rod connecting said bars, straps connected with the ends of said bars and extending upwardly to lie against the hoof and having eyes at their upper ends, a chain extending through said eyes, and a pair of angle-plates connected by an adjusting screw and one of which plates is hinged to one end of said chain, while the other plate is provided with a projection to detachably receive the other end of said chain; substantially as set forth.

6. An attachment for horseshoes comprising front and rear bars transversely extending across the lower surface of the shoe and having calks on their end portions, a screw connecting said bars and enabling an adjustment of the same toward and from each other, straps connected with the ends of said bars and extending upwardly to lie against the hoof, and a flexible band connecting the upper ends of said straps and having means for tightening it around the hoof, the said calks being in the form of blocks of metal having downwardly converging sides and provided with threaded stems on their upper ends to be screwed into said bars; substantially as set forth.

7. An attachment for horseshoes comprising front and rear bars transversely extending across the lower surface of the shoe and having calks on their end portions, a screw connecting said bars and enabling an adjustment of the same toward and from each other, straps connected with the ends of said bars and extending upwardly to lie against the hoof, and a flexible band connecting the upper ends of said straps and having means for tightening it around the hoof, said bars at their outer ends having a series of threaded holes and the outer side straps having screw portions to enter any of said holes; substantially as set forth.

Signed at New York city, in the county of New York, and State of New York, this 10th day of March A. D. 1908.

WILLIAM J. MAGEE.

Witnesses:
 ARTHUR MARION,
 CHAS. C. GILL.